(12) United States Patent
Stana et al.

(10) Patent No.: US 7,010,757 B2
(45) Date of Patent: Mar. 7, 2006

(54) METHOD AND APPARATUS FOR LAUNCHING COMPUTER APPLICATIONS

(75) Inventors: Ronald Joseph Stana, Raleigh, NC (US); Edward Kurt Borchardt, Chapel Hill, NC (US)

(73) Assignee: Acterna, L.L.C., Germantown, MD (US)

( * ) Notice: Subject to any disclaimer, the term of this patent is extended or adjusted under 35 U.S.C. 154(b) by 875 days.

(21) Appl. No.: 09/759,660

(22) Filed: Jan. 12, 2001

(65) Prior Publication Data

US 2002/0093532 A1    Jul. 18, 2002

(51) Int. Cl.
*G06F 3/00* (2006.01)

(52) U.S. Cl. .................................... 715/823; 715/760

(58) Field of Classification Search ................ 345/847, 345/760, 748–749, 898, 837, 853, 846, 854–855, 345/804, 802; 717/174; 715/823, 824–825, 715/760, 749, 748, 821–822, 853–854, 965–966; 712/231, 245

See application file for complete search history.

(56) References Cited

U.S. PATENT DOCUMENTS

| | | | | |
|---|---|---|---|---|
| 5,909,545 A | * | 6/1999 | Frese et al. ................. | 709/208 |
| 6,026,437 A | * | 2/2000 | Muschett et al. ........... | 709/219 |
| 6,061,695 A | * | 5/2000 | Slivka et al. ................ | 715/513 |
| 6,091,409 A | * | 7/2000 | Dickman et al. ........... | 715/847 |
| 6,256,032 B1 | * | 7/2001 | Hugh ......................... | 345/854 |
| 6,275,490 B1 | * | 8/2001 | Mattaway et al. .......... | 370/352 |
| 6,374,402 B1 | * | 4/2002 | Schmeidler et al. ........ | 717/167 |
| 6,665,860 B1 | * | 12/2003 | DeSantis et al. ............ | 717/115 |
| 2003/0028850 A1 | * | 2/2003 | Quinn et al. ................ | 715/530 |
| 2005/0044541 A1 | * | 2/2005 | Parthasarathy et al. ..... | 717/173 |

\* cited by examiner

*Primary Examiner*—Steven P. Sax
(74) *Attorney, Agent, or Firm*—Allen, Dyer, Doppelt, Milbrath & Gilchrist, P.A.

(57) ABSTRACT

Method and apparatus for launching applications on a computer. A launcher allows a user to quickly determine which applications are installed and to start one or more selected applications. The launcher accesses an operating system registry to determine which applications are installed and where each application is installed. The launcher presents information in a file formatted using a scripted language such as hypertext markup language (HTML), so that the file can be read by a standard web browser application, such as the well-known Netscape Navigator™ or Microsoft Internet Explorer™. Thus, a user is presented with a standard graphical user interface that he or she most likely knows. The user makes the selection by clicking with his or her mouse. The display may simply list the installed applications, or it may list all known applications, showing unavailable applications with a different visual attribute than installed applications, for example, dimmed or grayed out text. When the user selects an application, the launcher determines the location of the selected application from tags in the HTML file and launches the selected application, suppressing any browser dialog boxes normally associated with remotely starting applications by preventing the browser from navigating to the selected application.

7 Claims, 29 Drawing Sheets

FIG. 2

```
<HTML>
<BODY>

<div tkn=mode id=whatMode demoMode=""> </div>
<div id=showText doWeShowText="true"> </div>

<div id=installed>
<span tkn=mentor id=mentor path=""></span>
<span tkn=lvagent id=linkview path=""></span>
<span tkn=core id=dominocore path=""></span>
<span tkn=examine id=examine path=""></span>
<span tkn=atm id=atmapp path=""></span>
<span tkn=frping id=frping path=""></span>
<span tkn=lvconsole id=console path=""></span>
<span tkn=pcany id=pcanywhere path=""></span>
<span tkn=wiz id=wizard path=""></span>
<span tkn=frcir id=framerelay path=""></span>
<span tkn=ipgen id=ipgen path=""></span>
<span tkn=proconvert id=proconvert path=""></span>
<span tkn=merge id=merge path=""></span>
<span tkn=toolbox id=toolbox path=""></span>
<span tkn=ipfltr id=atmipfilter path=""></span>
<span tkn=dna323 id=dna323 path=""></span>
</div>

</BODY>
</HTML>
```

FIG. 3

```
<HTML>
<BODY>

<div tkn=mode id=whatMode demoMode=""> </div>
<div id=showText doWeShowText="true"> </div>

<div id=installed>
<span tkn=mentor id=mentor path="Mentor.tag"></span>
<span tkn=lvagent id=linkview path="LVAgent.tag"></span>
<span tkn=core id=dominocore path="Core.tag"></span>
<span tkn=examine id=examine path="Examine.tag"></span>
<span tkn=atm id=atmapp path=""></span>
<span tkn=frping id=frping path=FRPing.tag"></span>
<span tkn=lvconsole id=console path=""></span>
<span tkn=pcany id=pcanywhere path="PCAny.tag"></span>
<span tkn=wiz id=wizard path=""></span>
<span tkn=frcir id=framerelay path="FRCIR.tag"></span>
<span tkn=ipgen id=ipgen path="IPGen.tag"></span>
<span tkn=proconvert id=proconvert path="ProConvert.tag"></span>
<span tkn=merge id=merge path="Merge.tag"></span>
<span tkn=toolbox id=toolbox path=""></span>
<span tkn=ipfltr id=atmipfilter path=""></span>
<span tkn=dna323 id=dna323 path=""></span>
</div>

</BODY>
</HTML>
```

FIG. 4

```
<HTML>
<HEAD>
    <title>NAS Launcher</title>
</HEAD>
<frameset rows="0%,*">
<frame src="launcherFlags.htm" name="frame0"
scrolling="no"
frameborder="0"
noresize
>
<frame src="launcherMenu_htm" name="frame1"
frameborder="0"
noresize>
>
</frameset>
</HTML>
```

FIG. 5A

```
<html>

<!-- TRANSLATABLE MATERIAL NEAR BOTTOM OF FILE -->
<!-- Search for "Translation" -->

<head>
<title>DominoNAS</title>
<style TYPE="text/css">

.clsMainMenu {font-family:"Arial"; font-size:12; font-weight:bold; line-height:14pt;
color:#003399; position:absolute; left:0; top:0; cursor:default; z-index:1;
visibility:hidden;}

.clsPopupMenu {font-family:"Arial"; font-size:11; font-weight:bold; line-height:11pt;
color:#000000; padding:-1px; padding-left:0px; position:absolute; overflow:visible;
left:0; top:0; clip:rect(0,0,0,0); cursor:hand;
z-index:99;}

.clsNotInstalled {font-family:"Arial"; font-size:11; font-weight:bold; line-height:11pt;
color:#999999; padding:-1px; padding-left:0px; position:absolute; overflow:visible;
left:0; top:0; clip:rect(0,0,0,0); cursor:default;
z-index:99;}

.clsDemoMode {font-family:"Helvetica"; font-size:20; font-weight:bold;
line-height:20pt; color:#003399; position:absolute; visibility:hidden;
left:250; top:103; cursor:default; z-index:99;}

.clsBullet {position:absolute; left:0; top:0; cursor:default; display:none;
z-index:98;}

.clsBulletHotspot {position:absolute; left:0; top:0; cursor:default; display:block;
z-index:99;}

.clsText {font-family:"Arial"; font-size:12; font-weight:normal; line-height: :16pt;
color:#000000; background-color:#eeeeee; position:absolute;left:0; top-0;
padding-left:3; padding-right:3; clip:rect(0,0,0,0); cursor:default;
z-index:99;}

.clsWarningText {font-family:"Arial"; font-size:12; font-weight:normal;
line-height:16pt; color:#ff0000; background-color:#ffffff; position:absolute;
left:0; top:0; clip:rect(0,0,0,0); cursor:hand; z-index:99;}
```

FIG. 5B

```
</style>
<base target="main">
</head>
<body BGCOLOR="#FFFFFF" onLoad="display()">
<script language=ECMAScript">

// ======================================================== //
// TRANSLATION:                                              //
// Note to translator: you can increase or decrease this number to adjust //
// where the descriptive text appears on the right-hand side of the menu  //
// ======================================================== //
var textOffset=152 // offset from col2left //
// ======================================================== //
// ======================================================== // var helptxtid="initialize";
var helptxtobj="";
var bulletobj;
var oldmenu;
var launcherHelp="";
var submenu="initialize";
var submenuitem="initialize";
var col1right=0;  // this will be set later //
var leftmargin=12;
var leftBulletOffset=36;
var rightBulletOffset=52;
var bulletOffsetTop=10;
var logoOffset=-77;  // //
var logoTop=10;
var graphicWidth=145;
var col2Left=0;  // set later to col1right+graphicWidth //
var bannerHeight=153;
var textTop=bannerHeight+150;
var notOffset=bannerHeight+25 // offset of "not installed" msg from banner //
var linehite=18;  // vertical distance between items in submenus //
var hotspotNum=1;
```

FIG. 5C

```
function display() {

//                              //
// Main Menu                    //
//                              //

// ============================================== //
// TRANSLATION:                                    //
// ============================================== // expert.innerText="Expert Analysis";
mentor.innerText="Mentor";
isdnpartner.innerText="ISDNpartner";
monitor.innerText="Monitor, Capture, Transmit";
atmapp.innerText="ATM Analysis Application";
dominocore.innerText="Domino Core";
frping.innerText="Frame Relay Ping";
linkview.innerText="LinkView Agent";
baseline.innerText="Performance";
framerelay.innerText="Frame Relay CIR";
ipgen.innerText="IPGen";
wizard.innerText="Wizard";
decode.innerText="Decode Protocols";
examine.innerText="Examine";
distributed.innerText="Remote Analysis";
console.innerText="LinkView Console";
pcanywhere.innerText="pcANYWHERE";
tools.innerText="Utilities";
proconvert.innerText="ProConvert";
ima.innerText="IMA Monitoring & Analysis";
merge.innerText="Merge";
toolbox.innerText="Network Tools";
atmipfilter.innerText="ATM IP Filtering";
dna323.innerText="VoIP";
```

FIG. 5D

```
// if not IE 5, issue warning //
if ( ieversion() < 5 ) {
    alert( "DominoNAS requires Internet Explorer 5.0 or higher" );
    return;
}
// get the application paths from top, invisible frame //
checkInstalled();
//                          //
// check if Demo Mode       //
//                          //
if (top.frames[0].whatMode.demoMode=="true") {demoMode.style.visibility="visible";}
//                          //
//                          //
// build LEFT-SIDE of Menu  //
//                          //
//                          //
// save length of longest LEFT-SIDE menu item // var maxtext=0;
var leftItems, key;
leftItems = {"1":"expert", "2":"monitor", "3":"baseline"}
for (key in leftItems) {menu=eval(leftItems[key]);         menu.innerText="
'+menu.innerText+" "; thistext=parseInt(menu.scrollWidth);
        if (thistext>maxtext) {
            maxtext=thistext;
        }
        // loop thru subitems //
        maxsub=loopSubitems(menu);
        if (maxsub>maxtext) {
            maxtext=maxsub;
        }
}
col1right=leftmargin+maxtext;
```

FIG. 5E

```
// build LEFT-SIDE of main menu //
// expert //
menu=eval(leftItems["1"]);
menu.style.top=bannerHeight+45;
// remote //
menu=eval(leftItems["2"]);
menu.style.top=bannerHeight+107;
// baseline //
menu=eval(leftItems["3"]);
menu.style.top=bannerHeight+235;
for (key in leftItems) {
    menu=eval(leftItems[key]);
    menu.margin=col1right;
    menu.style.left=menu.margin-menu.scrollWidth;
    menu.noWrap=true;
    menu.style.visibility="visible";

// position bullet //
    leftPos=col1right+leftBulletOffset;
    topPos=menu.offsetTop-bulletOffsetTop;
    locateBullet(menu, topPos, leftPos);
}
// initialize bulletobj to a bullet, it doesn't matter which one since it is hidden //
bulletobj=menu.bullet;

//                              //
// display LOGO                 //
//                              // logo.style.left=col1right+logoOffset;
logo.style.top=bannerHeight+logoTop;
logo.style.visibility="visible";
```

```
//                            //
// build RIGHT-SIDE of Menu   //
//                            //
//                            //
```

FIG. 5F var rightItems, key;

rightItems = {"1":"decode", "2":distributed", "3":"tools"}

// monitor // menu=eval(rightItems["1"]);

menu.style.top=bannerHeight+59;

// decodes // menu=eval(rightItems["2"]);

menu.style.top=bannerHeight+115;

// utilities // menu=eval(rightItems["3"]);

menu.style.top=bannerHeight+180;

col2left=col1right+graphicWidth;

for (key in rightItems) { menu=eval(rightItems[key]);

menu.style.left=col2left;

menu.margin=col2left;

menu.noWrap=true;

menu.style.visibility="visible";

// loop thru subitems // maxsub=loopSubitems(menu);

// override the maxtext value, so that subitems in the right column line //

// up with the left margin of that column. // submenu=eval(menu.submenu);

submenu.maxtext=0;

// save bullet location // leftPos=col2left-rightBulletOffset;

topPos=menu.offsetTop-bulletOffsetTop-1;

locateBullet(menu, topPos, leftPos);

FIG. 5G

```
    }
  } function checkInstalled() {
    apps=top.frames[0].installed.all.tags("span");
    for (j=0;j<apps.length;j++) {
       menuitem=eval(apps[j].id);
       menuitem.path=apps[j].path;
    }
} function locateBullet(menu, top, left) {
        hotspot=eval(bulletHotspot"+hotspotNum);
        hotspot.menu=menu;  // changed to current menuitem each time bullet is displayed
//
        hotspot.style.left=String(parseInt(left))+"px";
        hotspot.style.top=top;
        hotspotNum=hotspotNum+1;
        blt=eval("bullet");
        blt.menu=menu;  // changed to current menuitem each time bullet is displayed //
        menu.bulletLeft=String(parseInt(left))+"px";
        menu.bulletTop=top;
        menu.bullet=blt;
} function loopSubitems(menu) {
    // calculate the longest text string in subitems //
    submenu=eval(menu.submenu);
    submenu.noWrap=true;
    subitems=submenu.all.tags("span");
    maxsub=0;
    for (j=0;j<subitems.length;j++) {
       subitm=subitems[j];
```

FIG. 5H

```
    // if not installed, grey out //
    if (subitm.path=="") {
        subitm.className="clsNotInstalled";
    }
    subitm.innerHTML=" "+subitm.innerHTML+"<br>";
    thistext=parseInt(subitm.scrollWidth);
    // for col1 we need to back up by length of subitem    //
    // for col2 we don't back up at all, but start at col2left //
    if (col1right==0) {
        subitm.adjust=thistext;
    }
    else {
        subitm.adjust=0;
    }
    if (thistext>maxsub) {
        maxsub=thistext;
    }
  }
  submenu.maxtext=maxsub;
  return maxsub;
}
function expand(menu) {
    // if same menu as before, don't need to expand, get out right away //
    // if new menu, remember it                                          //
    if (menu==oldmenu) {
        return;
    }
    else {
        oldmenu=menu;
    }
    // undisplay any subtopics that might have been displayed    //
    // and normalize any application name that was highlighted   //
```

```
    submenu.style.display="none";
    if (submenuitem!="initialize") {  // get rid of conditional ??? //
        submenuitem.style.backgroundColor="";
        submenuitem.style.color=#000000";
    }
    //    //
    // hide old bullet, hilite new bullet, and save new bullet //
    bulletobj.style.display="none";
    blt=eval("bullet");
    blt.style.display="block";
    blt.menu=menu;  // changed to current menuitem each time bullet is displayed //
    blt.style.left=menu.bulletLeft;
    blt.style.top=menu.bulletTop;
    bulletobj=blt;
    //    //
    // expand submenu //
    // and remember last submenu displayed //
    //    //
    submenu=eval(menu.submenu);
    submenu.style.display="block";
    subitems=submenu.all.tags("span");
    for (j=0;j<subitems.length;j++) {
        subitm=subitems[j];
        subitm.style.top=menu.offsetTop+(j+1)*linehite;
        subitm.style.left=menu.margin-subitm.adjust;
        subitm.style.display="block";
        subitm.style.clip="rect(0 100% 100% 0)";
    }
    // display help text //
    showText(menu); //
}
```

```
function hilite(e) {
  // hilite application names and display help text //
  // normalize old item
  if (submenuitem!="initialize") {     // get rid of conditional ??? //
    submenuitem.style.backgroundColor="";
    submenuitem.style.color="#000000";
  }
  // hilite new item, unless changed to clsNotInstalled //
  if (e.className=="clsPopupMenu") {
    e.style.backgroundColor="003399";
    e.style.color=#ffffff";
    submenuitem=e;
  }
  // display help text //
  showText(e) ; //
}
function showText(e) {
  // always hide the "not installed" message //
  // then, if the current app is not installed, display message //
  notinstalled.innerText="";
  if (e.className=="clsNotInstalled") {
    notinstalled.style.left=col2left+textOffset;
    notinstalled.style.top=notOffset;
    notinstalled.style.fontWeight="bold";
    notinstalled.style.display="block";
    notinstalled.style.clip="rect(0 100% 100% 0)";
    notinstalled.style.cursor="default";
    if (e.id=="atmipfilter") {
      notinstalled.innerHTML=notatmipfilter.innerHTML;
    }
    else {
      notinstalled.innerText=e.innerText+" "+notinstalledtext.innerText;
    }
  }
}
```

```
// now display text, and save it's id in helptxtid for future erasing //
if (e.helpid != null) {
    // hide any previous text //
    hideText();
    helptxtid=e.helpid;
    helptxtobj=eval(helptxtid);
    helptxtobj.style.left=col2left+textOffset;
    helptxtobj.style.top=textTop;
    helptxtobj.style.display="block";
    helptxtobj.style.clip="rect(0 100% 100% 0)";
    }
}
function hideText() {
    // erase previous text //
    helptxtobj=eval(helptxtid);
    eval(helptxtid+".style.clip='rect(0 0 0 0)';");    // simplify this ??? //
}
function showOrHideText() {
    if (top.frames[0].showText.doWeShowText!="true") {
        hideText();
    }
}
function link(e) {
    if (e.path != "") {
        document.location.href=e.path;
    }
}
function ieversion()
// Return Microsoft Internet Explorer (major) version number, or 0 for others //
// This function works by finding the 'MSIE" string and extracting the version number //
// following the space, up to the decimal point for the minor version, which is ignored //
{
```

```
        var ua = window.navigator.userAgent;
        var msie = ua.indexOf ( "MSIE " );
        if ( msie > 0 ) {         // is Microsoft Internet Explorer; return version number //
           return parseInt ( ua.substring ( msie+5, ua.indexOf ( ".", msie ) ) )
        }
        else {
           return 0;         // is other browser //
        }
     }
  }
</script>

<span>
<TABLE width="100%" align="center" valign="TOP">
<TR>
    <TD align="left" valign="bottom">
<a href="http://www.wwgsolutions.com/products/dominonas/nasuser.html">
<IMG align="bottom" alt="" border="0" width="231" height="52"
src="images/DominoNAS.jpg">
</a>
    </TD>
    <TD><a href="http://www.wwgsolutions.com"><IMG id=wave align="right"
alt="" border="0" height="123" width="231"
    src="images/wave.jpg"></a>
    </TD>
</TR>
<TR>
  <TD height="10" colspan="2" align="left" bgcolor="#cc9900">
  </TD>
  <TD>
  </TD>
</TR>
</TABLE>
</span>
```

FIG. 5M

```
<!--                    -->
<!-- Expert analysis    -->
<!--                    -->

<div id="expert" class="clsMainMenu"
onMouseOver="expand(this)" submenu="expertPopup" >
</div>

<!-- side menu -->

<div ID="expertPopup">
<span id="mentor" path="" onClick="link(this)" class="clsPopupMenu"
onmouseover="hilite(this)"
helpid="IDH_MENTOR">
</span>

<span id="isdnpartner" path="" onClick="link(this)" class="clsPopupMenu"
onmouseover="hilite(this)"
helpid="IDH_ISDNPARTNER">
</span>

</div>

<!--                    -->
<!-- Monitor/Capture    -->
<!--                    -->

<div id+"monitor" class="clsMainMenu"
onmouseover="expand(this)" submenu="monitorPopup"
>

</div>

<!-- side menu -->
<div ID="monitorPopup">
```

FIG. 5N

```
<span id="atmapp" path="" onClick="link(this)" class="clsPopupMenu"
onmouseover="hilite(this)"
helpid="IDH_ATM">
</span>

<span id="dominocore" path="" onClick="link(this)" class="clsPopupMenu"
onmouseover="hilite(this)"
helpid="IDH_CORE">
</span>

<span id="frping" path="" onClick="link(this)" class="clsPopupMenu"
onmouseover="hilite(this)"
helpid="IDH_FR_PING">
</span>

<span id="linkview" path="" onClick="link(this)" class="clsPopupMenu"
onmouseover="hilite(this)"
helpid="IDH_LINKVIEW">
</span>

<span id="dna323" path="" onClick="link(this)" class="clsPopupMenu"
onmouseover="hilite(this)"
helpid="IDH_DNA323">
</span>
</div>

<!--                        -->
<!-- Performance (aka Baselining) -->
<!--                        -->
```

```
<div id="baseline" class="clsMainMenu"
onMouseOver="expand(this)" submenu="detailedPopup" >
</div>

<!-- side menu -->

<div ID="detailedPopup">
<span id="framerelay" path="" onClick="link(this)" class="clsPopupMenu"
onmouseover="hilite(this)"
helpid="IDH_FR_CIR">
</span>
<span id="ipgen" path="" onClick="link(this)" class="clsPopupMenu"
onmouseover="hilite(this)"
helpid="IDH_IPGEN">
</span>
<span id="wizard" path="" onClick="link(this)" class="clsPopupMenu"
onmouseover="hilite(this)"
helpid="IDH_WIZARD">
</span>
</div>

<!--                    -->
<!--                    -->
<!-- Right column       -->
<!--                    -->
<!--                    -->

<!--                         -->
<!-- Distributed analysis    -->
<!--                         -->

<div id="distributed" class="clsMainMenu"
onMouseOver="expands(this)" submenu="distributedPopup" >
</div>
```

FIG. 50

<!-- side menu -->

FIG. 5P

```
<div ID="distributedPopup">
<span id="console" path="" onClick="link(this)" class="clsPopupMenu"
onmouseover="hilite(this)"
helpid="IDH_LINKVIEW_CONSOLE">
</span>
<span id="pcanywhere" path="" onClick="link(this)" class="clsPopupMenu"
onmouseover="hilite(this)"
helpid="IDH_PCANYWHERE">
</span>
</div>

<!--              -->
<!-- Protocol decode  -->
<!--              -->

<div id="decode" class="clsMainMenu"
<onMouseOver="expand(this)" submenu="decodePopup" >
</div>

<!-- side menu -->

<div ID="decodePopup">
<span id="examine" path="" onClick="link(this)" class="clsPopupMenu"
onmouseover="hilite(this)"
helpid="IDH_EXAMINE">
</span>
</div>

<!--              -->
<!-- Tools    -->
<!--              -->

<div id="tools" class="clsMainMenu"
<onMouseOver="expand(this)" submenu="toolsPopup" >
</div>
```

```
<!-- side menu -->

<div ID="toolsPopup">

<span id="atmipfilter" path="" path="" onClick="link(this)" class="clsPopupMenu"
onmouseover="hilite(this)"
helpid="IDH_ATMIPFILTER">

</span>

<span id="ima" path="" onClick="link(this)" class="clsPopupMenu"
onmouseover="hilite(this)"
helpid="IDH_IMA">

</span>

<span id="merge" path="" path="" onClick="link(this)" class="clsPopupMenu"
onmouseover="hilite(this)"
helpid="IDH_MERGE">

</span>

<span id="toolbox" path="" path="" onClick="link(this)" class="clsPopupMenu"
onmouseover="hilite(this)"
helpid="IDH_TOOLBOX">

</span>

<span id="proconvert" path="" onClick="link(this)" class="clsPopupMenu"
onmouseover="hilite(this)"
helpid="IDH_PROCONVERT">

</span>

</div>

<span id=notinstalled class+"clsWarningText">
</span>

<!-- end of menu -->
<!-- end of menu -->
<!-- end of menu -->
<!-- end of menu -->
<!-- end of menu -->
<!-- end of menu -->
```

```
<!-- end of menu -->
<div id="initialize" class="clsText">
<!-- this is here to have a guaranteed id   -->
<!-- so that the hideText () function doesn't   -->
<!-- bomb the first time through   -->
</div>

<img id=bullet class="clsBullet" src="images/bullet_on.jpg"</img>

<img id=bulletHotspot1 class="clsBulletHotspot"
onmouseover="expand(this.menu)" src="images/bulletHotspot.gif"
</img>
<img id=bulletHotspot2 class="clsBulletHotspot"
onmouseover="expand(this.menu)" src="images/bulletHotspot.gif"
</img>
<img id=bulletHotspot3 class="clsBulletHotspot"
onmouseover="expand(this.menu)" src="images/bulletHotspot.gif"
</img>
<img id=bulletHotspot4 class="clsBulletHotspot"
onmouseover="expand(this.menu)" src="images/bulletHotspot.gif"
</img>
<img id=bulletHotspot5 class="clsBulletHotspot"
onmouseover="expand(this.menu)" src="images/bulletHotspot.gif"
</img>
<img id=bulletHotspot6 class="clsBulletHotspot"
onmouseover="expand(this.menu)" src="images/bulletHotspot.gif"
</img>

<img id=logo style="z-index:-1; position:absolute; visibility:hidden;
height:276; width:213"
src="images/domino.jpg"</img>

[HELP TEXT FOR TRANSLATION GOES HERE]

</body>
</html>
```

FIG. 6A

```
<!-- DON'T TOUCH ANYTHNG ABOVE THIS LINE -->
<!-- ALL THE TRANSLATABLE MATERIAL IS BELOW THIS LINE -->
<!-- You can use any HTML tags (except SPAN) within the text -->

<!-- start of help text for translation -->
<!-- start of help text for translation -->
<!-- start of help text for translation -->
<!-- start of help text for translation -->
<!-- start of help text for translation -->
<!-- start of help text for translation -->

<!-- Note: The application name is automatically inserted at the beginning of this line,
-->
<!-- automatically followed by a space, -->
<!-- followed by the following text -->
<span id=notinstalledtext class="clsNotInstalled">
is not installed.
</span>

<!-- Note: ATM IP Filtering has its own "not installed" message -->
<!-- which is as follows -->
<span id=notatmipfilter class="clsNotInstalled">
ATM IP Filtering is not installed.
<p>
You can install it by selecting "Install ATM IP Filtering" on the
CD browser that appears when you insert the DominoNAS CD.
</span>

<!-- NAS is running in "Demo Mode" -->
<span id=demoMode class="clsDemoMode">
Customer Evaluation
</span>
```

FIG. 6B

```
<!-- Mentor -->

<span id="IDH_MENTOR" class="clsText">
Mentor analyzes network traffic, identifies problem areas,
and suggests steps to resolve the problems.
<p>
Mentor can analyze traffic captured in a variety of file formats. Real-time
analysis can be performed when Mentor is installed on a DominoWAN,
DominoLAN, or DominoFE analyzer.
</span>

<!-- ISDNPartner -->

<span id="IDH_ISDNPARTNER" class="clsText">
ISDNpartner performs expert ISDN analysis in real-time and on capture files.
</span>

<!-- LinkView -->

<span id="IDH_LINKVIEW" class="clsText">
LinkView Agent performs full network analysis, including traffic capture and
protocol decoding, across a standard Ethernet or Token Ring interface card--no
separate analyzer is required.
<p>
For superior performance and Ethernet collision detection, specialized NIC cards
are available from WWG.
</span>

<!-- DominoCore -->

<span id="IDH_CORE" class="clsText">
Domino Core software works with Domino analyzers to monitor, capture, and
transmit network traffic on Token Ring, 10/100/1000 Ethernet, WAN, and FDDI circuits.
<br></span>
```

FIG. 6C

```
<!-- ATM Analysis Application -->
<span id="IDH_ATM" class="clsText">
```
The ATM Alalysis Application works with DominoATM analyzers to monitor, capture, and transmit ATM traffic, and to provide complete QoS measurement.
```
</span>
<!-- Frame Relay Ping -->
<span id="IDH_FR_PING" class="clsText">
```
The Frame Relay Ping application enables DominoWAN and DominoHSSI analyzers to generate IP ping packets encapsulated in Frame Relay.
```
<p>
```
Multiple IP addresses and DLCIs can be configured as ping targets.
This application is part of the Frame Relay Suite that is available with DominoNAS Advanced.
```
</span>

<!-- Wizard -->
<span id="IDH_WIZARD" class="clsText">
```
The Wizard application is the most detailed baselining application available in the industry. Wizard provides extensive reporting capabilities to present the comprehensive baseline data that the system collects.
```
<p>
```
For effective network planning and trending, you can generate customized reports that demonstrate trends in utilization, protocol distribution, station activity, and more. Wizard is available with DominoNAS Advanced.
```
</span>

<!-- Frame Relay CIR -->
<span id="IDH_FR_CIR" class="clsText">
```
Frame Relay CIR is a software package designed to monitor Frame Relay circuits. `<p>`Information is displayed in graphs and tables showing the utilization of each DLCI as well as FECN, BECN and DE frames.
This application is part of the Frame Relay Suite that is available with DominoNAS Advanced.
```
</span>
```

FIG. 6D

```
<!-- LinkView Console -->
<span id="IDH_LINKVIEW_CONSOLE" class="clsText">
LinkView Console enables you to analyze and capture traffic on remote LAN segments.
It controls LinkView Agents that you can install on Windows PCs on segments
around your network.
<p>
Three agents are included with DominoNAS, and more can be purchased from WWG if
needed.
</span>

<!-- pcANYWHERE -->
<span id="IDH_PCANYWHERE" class="clsText">
Use pcANYWHERE for remote control of Domino analyzers with the Domino Server.
<p>Each Domino Server can control up to 8 Domino analyzers of any type. It also
supports matrix switches to connect a single analyzer to multiple segments.
</span>

<!-- Examine -->
<span id="IDH_EXAMINE" class="clsText">
Examine decodes over 400 protocols in detail and identifies more than 900 protocols.
<p>
Network frames are displayed in coordinated summary, detail, and hex displays.
Multiple filter options make it easy for you to focus on specific criteria.
</span>

<!-- ProConvert -->
<span id="IDH_PROCONVERT" class="clsText">
ProConvert takes files captured by non-WWG analyzers and converts them to WWG
format. You can then use DominoNAS to work with the converted files.
<p>
Support is included for files captured with Microsoft NT Netmon and Sun Snoop,
as well as files captured with other protocol analyzers.
</span>
```

FIG. 6E

```
<!-- IMA -->

<span id="IDH_IMA" class="clsText">
The IMA Monitoring & Analysis application captures traffic on several
Inverse Multiplexing for ATM (IMA) links between devices. It then merges
the captured data into one file for analysis.
This application is available with DominoNAS Advanced.
</span>

<!-- IPGen -->

<span id="IDH_IPGEN" class="clsText">
IPGen turns your PC's NIC into an IP traffic load generator.
You can define a variety of transmit parameters and then execute them
sequentially to test the effect of traffic loading on the network.
</span>

<!-- Merge -->

<span id="IDH_MERGE" class="clsText">
Merge enables you to use multiple Domino analyzers for simultaneous capture of
each link on an EtherChannel backbone.
Merge can combine the multiple capture files into a single file
while retaining the original time relationship of the frames.
</span>

<!-- Network Tools -->

<span id="IDH_TOOLBOX" class="clsText">
Network Tools include Ping, Trace Route, Lookup, WhoIs, Finger, WhoAmI,
ISP Lookup, and Domain Finder.
</span>
```

FIG. 6F

```
<!-- ATM IP Filtering -->

<span id="IDH_ATMIPFILTER" class="clsText">
The ATM IP Filtering Application provides frame-level filtering of ATM traffic
based on protocol-layer addresses (MAC, IP, IPX). The results are saved in a
file that contains filtered, reassembled frames.
</span>

<!-- DNA-323 -->

<span id="IDH_DNA323" class="clsText">
The DNA-323 application provides comprehensive monitoring, capturing,
and troubleshooting capabilities for voice-over-packet networks.
</span>

<!-- end of help text for translation -->
<!-- end of help text for translation -->
<!-- end of help text for translation -->
<!-- end of help text for translation -->
<!-- end of help text for translation -->
<!-- end of help text for translation -->
<!-- end of help text for translation -->
``` us 7,010,757 B2

METHOD AND APPARATUS FOR LAUNCHING COMPUTER APPLICATIONS

BACKGROUND

1. Field of the Invention

This invention is related to the way applications are started on a computer system. More particularly, this invention is related to starting applications on a computer from within a web browser.

2. Description of the Problem

Computer applications programmed in languages such as Visual Basic and C++ have the ability to interact with the host computer's operating system, including the file system. This ability allows those applications to easily locate and start other applications. World Wide Web applications, usually written in some form of hypertext markup language (HTML) however, do not share this same ability to interact with the host operating system. While Microsoft's "ActiveX" controls and scripting languages such as Visual Basic Script support interaction with the host operating system, these approaches are only supported on Microsoft's Windows™ based operating systems. JavaScript and Java Applets do not allow access to the Microsoft Window's registry which is where most application information is stored on Microsoft Windows based operating systems. What is needed is an efficient, fast and user-friendly way to identify, display, and launch applications within a computer without being tied down to a specific operating systems, and without unnecessary or distracting dialog being presented to a user.

SUMMARY

The present invention meets the above needs by providing a "launcher" application that operates on a computer. The launcher allows a user to quickly determine which applications are installed and to start one or more selected applications. The launcher presents information to the user using hypertext markup language (HTML), a standard scripting language that can be read by a standard web browser application, such as Netscape Navigator™ or Microsoft Internet Explorer™. Thus, a user is presented with a standard graphical user interface that he or she most likely knows. When we refer to the scripting language HTML in this disclosure, we mean HTML or any of its variants, such as dynamic HTML (DHTML). More advanced features, such as "graying out" of applications that are not installed are performed using more advanced, known, scripting languages such as ECMAScript. The launcher suppresses browser dialog boxes that a user may find out of place or inappropriate in the particular operating environment.

In one embodiment of the invention, the launcher accesses an operating system registry to determine which applications are installed on the computer and where each application is installed. The launcher then creates a hypertext markup language (HTML) file specifying the applications that are installed. The information in the HTML file is displayed so that a user can select any one of the applications that is installed as a selected application to launch. The user makes the selection in this embodiment by clicking with his or her mouse. The display may simply list the installed applications, or it may list all known applications, showing unavailable or uninstalled applications with a different visual attribute than installed applications, for example, dimmed or grayed out text. If the user selects an application, the launcher determines which application was selected from tags in the hyperlink, stops browser navigation and starts the selected application.

In one embodiment, the invention works on a small computer such as a personal computer or workstation. Software that implements aspects of the present invention can be stored on a media. The invention is implemented by a computer program product, which includes a computer program containing computer instructions. The computer program product can be supplied on a media such as diskette, tape, or fixed disc, or optical, such as a CD-ROM. Additionally, the computer program product can be supplied via the Internet or some other type of network. Workstations or servers that run the software include a plurality of input/output devices, a processor, and memory devices that store and execute the instructions necessary to implement the invention.

BRIEF DESCRIPTION OF THE DRAWINGS

FIG. 2 shows a launcherflags.ini initialization file according to one embodiment of the invention.

FIG. 3 illustrates a launcherflags.htm HTML file according to one embodiment of the invention.

FIG. 4 shows a launcher.htm file according to one embodiment of the invention.

FIG. 5 illustrates a launchermenu.htm file according to one embodiment of the invention. FIG. 5 is divided into FIGS. 5A through 5R or convenience.

FIG. 6 shows the help text that can be used in the launchermenu.htm file of FIG. 5. FIG. 6 is divided into FIGS. 6A through 6F for convenience.

DETAILED DESCRIPTION OF ONE OR MORE EMBODIMENTS

Figure 1:
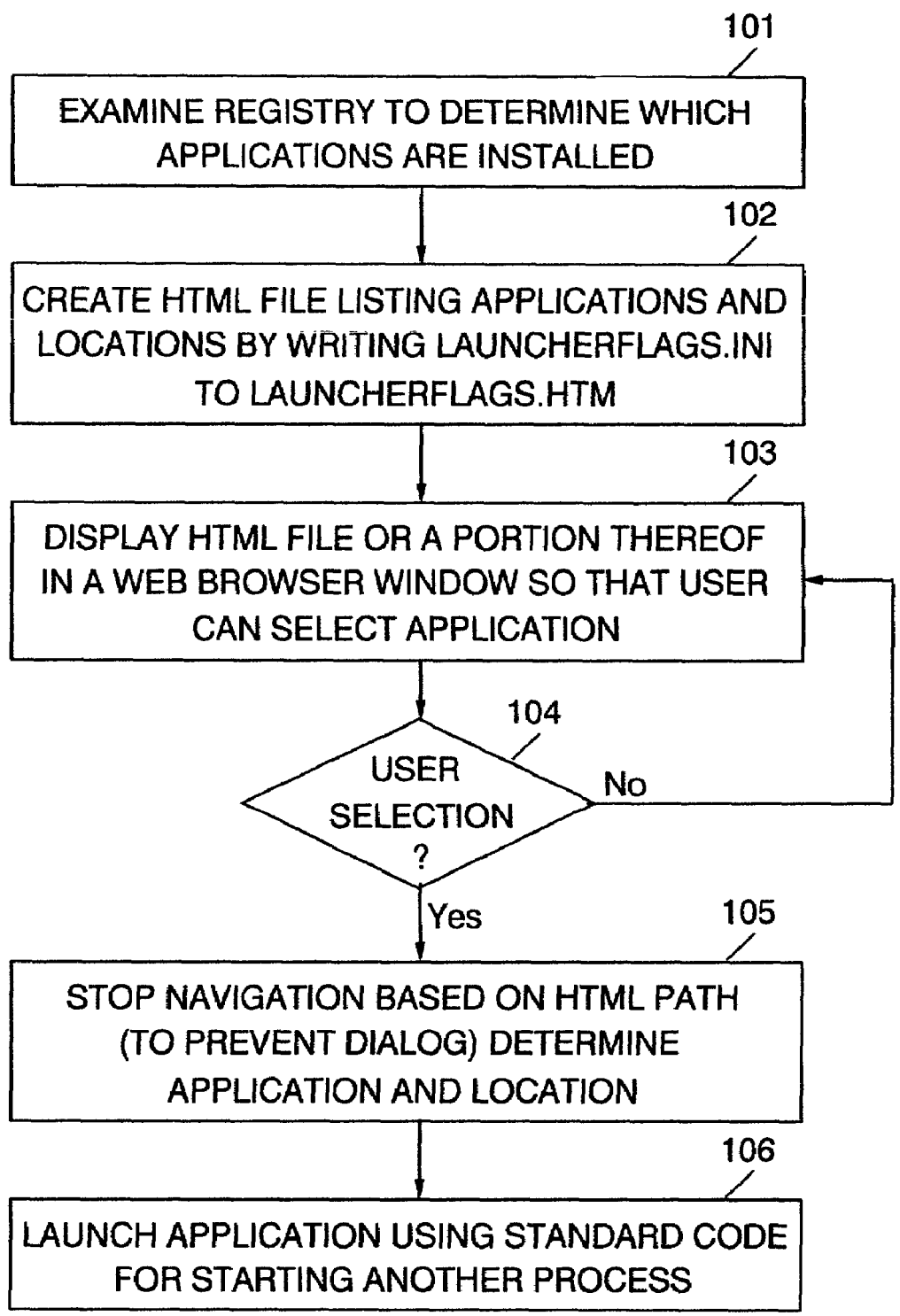
FIG. 1 is a flowchart that illustrates the method of one embodiment of the invention.

FIG. 1 illustrates the overall method of the invention according to one embodiment. The launcher is an application that utilizes the Microsoft™ WebBrowser control, which is the foundation for the Microsoft™ Internet Explorer application. The WebBrowser control is a Windows™ extension that is capable of displaying an HTML page, as you would see it in a web browser.

It is highly desirable for the invention to use a standard interface that works with many applications. A web browser interface is a good choice since it is well known because of the popularity of the Internet.

In one embodiment, when the launcher is started, it checks the Windows registry at step 101 of FIG. 1 to determine which applications are installed. It then reads an initialization file, commonly known as an "ini" file. In this embodiment, the file is called LauncherFlags.ini (see FIG. 2), the launcher writes out a copy of it in HTML at step 102. In this embodiment, the HTML file is named LauncherFlags.htm (see FIG. 3). To make the copy, the contents of LauncherFlags.ini are copied line by line and lines containing the text "tkn=" are updated to reflect the status of that element on the PC or workstation running the launcher. Each application has its own line and hence its own "tkn=" value. For applications that are not installed, the "path=" portion of the line will be made equal to an empty value, in this example, empty double quotes. For applications that are installed, the "path=" portion of the line will be made equal to a unique name followed by the text ".tag". After LauncherFlags.htm has been written, an HTML portion of the launcher, called Launcher.htm, then asks the WebBrowser control to display an HTML page (see FIG. 4). The appropriate HTML file or files is displayed in a window at step 103 so that a user can select an application to launch.

In this example, Launcher.htm loads two frames at step 103. LauncherFlags.htm is in one frame and that entire frame is made invisible, and LauncherMenu.htm (See FIG. 5) is in a second frame and that frame is made visible. DHTML and ECMAScript in LauncherMenu.htm reference the id's in LauncherFlags.htm to determine what color the text should be for each of the launchable applications. Dynamic HTML is an extension to HTML that allows dynamic positioning, hiding and showing of HTML elements. This color distinction provides a visual attribute to distinguish installed from uninstalled or unavailable applications (black text if the application is installed, grayed out text if the application is not installed). When the user mouse clicks on an application name that is installed, the selection is detected at step 104, and LauncherMenu.htm tries to navigate to whatever was specified in the "path portion of the matching id in LauncherFlags.htm. The WebBrowser control allows the launcher to "see" where the user is trying to navigate and to optionally stop that navigation. The launcher application stops all navigation by the browser to paths ending in ".tag" and reads the unique text that preceded the ".tag" extension and does a look up with that text to determine which application the user wants to start and where it is located at step 105. Standard code for starting another process is then used to start the user-requested application at step 106. Since the browser does not start the application, the user does not see a disruptive dialog box asking whether the user wants to save or run the application, or warning the user that an application is about to be run.

FIGS. 2, 3, 4, and 5 illustrate examples of files used in one embodiment of the invention. FIG. 2 is an example LauncherFlags.ini file. Each time the launcher starts, it copies this file to LauncherFlags.htm, but inserts values for the paths for applications that are installed. Notice that this file shows multiple applications. Names that have been used for applications by way of example include "mentor", "linkview", "dominocore", "examine", "atmapp", "frping", "console", and others listed in the "span" statements. Also note that all paths are equal to nothing. "SPAN" is an HTML tag that is not displayed and thus is used to define the "tkn", "id" and "path" variables that are used by LauncherMenu.htm. FIG. 3 shows the result of LauncherFlags.ini being copied to LauncherFlags.htm. Each application that is installed has a value for a path. For example, the application "mentor" has a path of "mentor.tag". In FIG. 3, paths are null for applications "atmapp", "console", "wizard", "toolbox", "ipfilter", and "dna323". FIG. 4 shows the HTML portion of the launcher application. The "frameset rows" statement hides the frame containing LauncherFlags.htm. Only LauncherMenu.htm is visible.

FIG. 5 illustrates an example of a LauncherMenu.htm file. FIG. 5 is divided into FIGS. 5A through 5R for convenience. Note that much of the HTML code generates displayed text. It is convenient to be able to translate this text into different languages to facilitate ease of use on computer systems of various countries. Sections of the file that can be translated are commented. The file includes a space where a translation help file can be inserted near the end. FIG. 6 illustrates an example of such a help file. FIG. 6 is divided into FIGS. 6A through 6F for convenience. The files illustrated in FIGS. 5 and 6 refer to a particular product of the assignee of the invention called "DominoNAS." However the various HTML statements that generate title and other text information can be modified to refer to any product or software program that might accompany a launcher according to the present invention. Applications referred to in the Figures include, as before, PCAnywhere, Mentor, and others, but the invention can be made to work with any applications.

Figure 7:
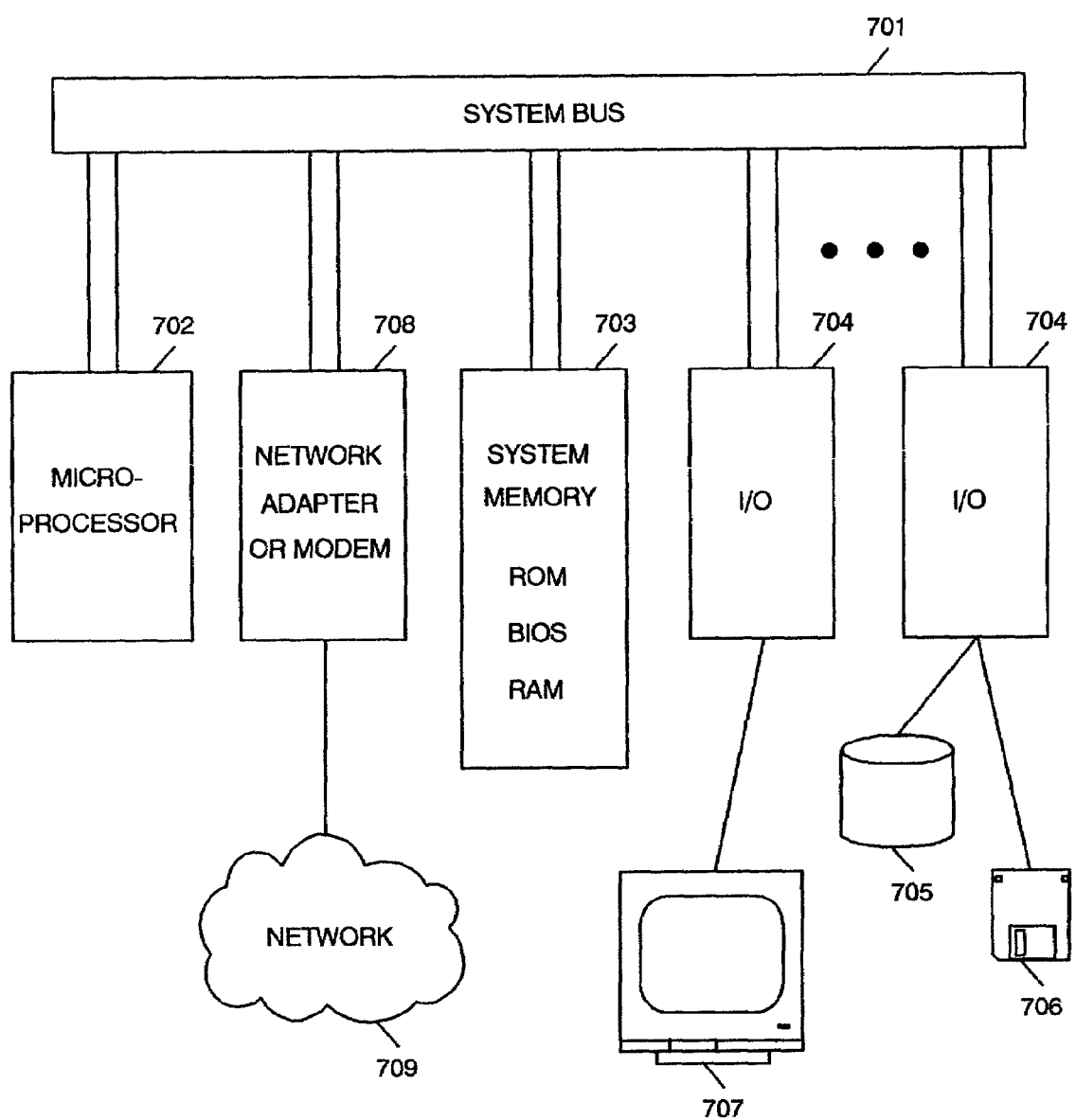
FIG. 7 is a block diagram illustrating an example computing system that executes the computer program product embodying the invention.

As previously mentioned, much of the software that is used to implement the invention resides on and runs on a computer system, which in one embodiment, is a personal computer, workstation, or server. FIG. 7 illustrates further detail of a computer system that is implementing the invention. System bus 701 interconnects the major components. The system is controlled by microprocessor 702, which serves as the central processing unit (CPU) for the system. System memory 703 is typically divided into multiple types of memory or memory areas, such as read-only memory (ROM), random-access memory (RAM) and others. If the computer system is an IBM compatible personal computer, the system memory also contains a basic input/output system (BIOS). A plurality of general input/output (I/O) adapters or devices, 704, is present. Only two are shown for simplicity. These connect to various devices including a fixed disk, 705, a diskette drive, 706, and a display, 707. The computer program instructions for implementing the invention are stored on the fixed disk, 705, as a computer program product and are partially loaded into memory 703 and executed by microprocessor 702. The system also includes another I/O device, a network adapter or modem, shown at 708, for connection to the network, 709. It should be noted that the system as shown in FIG. 7 is meant as an illustrative example only. Numerous types of general-purpose computer systems are available and can be used to implement the invention. Available systems include those that run operating systems such as Windows™ by Microsoft and various versions of UNIX.

As previously mentioned, a computer program product in combination with the appropriate hardware implements the invention. This computer program product includes a computer program made up of computer program code or instructions. The computer program code is often stored on storage media. This media can be a diskette, hard disk, CD-ROM, DVD-ROM, or tape. The media can also be a memory storage device or collection of memory storage devices such a read-only memory (ROM) or random access memory (RAM). Additionally, the computer program code can be transferred to a workstation over the Internet or some other type of network. The diskette drive of FIG. 7 is indicated by a drawing of one type of media, a diskette, which can be used to initially transfer some of the computer program code of the invention to the computer system of FIG. 7. A diskette typically includes magnetic media enclosed in a protective jacket. Magnetic field changes over the surface of the magnetic media are used to encode the computer program code.

We have described specific embodiments of our invention, which provides a way to start applications from a web browser on a computer. One of ordinary skill in the computer and networking arts will quickly recognize that the invention has numerous other embodiments. In fact, many implementations are possible. The following claims are in no way intended to limit the scope of the invention to the specific embodiments described.

We claim:

1. A method of launching a selected application on a computer, the method comprising the steps of:

accessing the operating system registry to determine which applications are installed and where each application is installed;

creating a hypertext markup language (HTML) file specifying the applications that are installed;

displaying the HTML file in a browser so that a user can select any one of the applications that is installed as a selected application to launch; and if the user selects an application as the selected application, determining the location of the selected application from tags in the HTML file and launching the selected application without allowing the browser to navigate to the application.

2. The method of claim 1 wherein the HTML file lists applications that are known but not installed and the file is displayed in the displaying step so as to show applications that are known but not installed with a specific visual attribute.

3. A computer program product for launching a selected application on a computer, the computer program product including a medium having a computer program embodied thereon, said program comprising:

instructions for accessing the operating system registry to determine which applications are installed and where each application is installed;

instructions for creating a hypertext markup language (HTML) file specifying the applications that are installed;

instructions for displaying the HTML file in a browser so that a user can select any one of the applications that is installed as a selected application to launch; and instructions for determining if an when a user as selected an application as the selected application, and determining the location of the selected application from tags in the HTML file and launching the selected application without allowing the browser to navigate to the selected application.

4. The computer program product of claim 3 wherein the HTML file lists applications that are known but not installed and the file is displayed by the instructions for displaying so as to show applications that are known but not installed with a specific visual attribute.

5. Apparatus for launching a selected application on a computer, the apparatus comprising:

means for accessing the operating system registry to determine which applications are installed and where each application is installed;

means for creating a hypertext markup language (HTML) file specifying the applications that are installed;

means for displaying the HTML file in a browser so that a user can select any one of the applications that is installed as a selected application to launch; and means for determining if an when a user as selected an application as the selected application, and determining the location of the selected application from tags in the HTML file and launching the selected application without allowing the browser to navigate to the application.

6. A programmed computer system, the programmed computer system operable to launch a selected application on a computer by performing the steps of:

accessing the operating system registry to determine which applications are installed and where each application is installed;

creating a hypertext markup language (HTML) file specifying the applications that are installed;

displaying the HTML file in a browser so that a user can select any one of the applications that is installed as a selected application to launch; and if the user selects an application as the selected application, determining the location of the selected application from tags in the HTML file and launching the selected application without allowing the browser to navigate to the application.

7. The computer system of claim 6 wherein the HTML file lists applications that are known but not installed and the file is displayed in the displaying step so as to show applications that are known but not installed with a specific visual attribute.

\* \* \* \* \*